United States Patent
Venkataraman et al.

(10) Patent No.: US 8,671,183 B2
(45) Date of Patent: Mar. 11, 2014

(54) SYSTEM FOR INTERNET SCALE VISUALIZATION AND DETECTION OF PERFORMANCE EVENTS

(75) Inventors: Shobha Venkataraman, Jersey City, NJ (US); Jeffrey Pang, Jersey City, NJ (US); Subhabrata Sen, New Providence, NJ (US); Oliver Spatscheck, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 268 days.

(21) Appl. No.: 12/967,869

(22) Filed: Dec. 14, 2010

(65) Prior Publication Data
US 2012/0151043 A1 Jun. 14, 2012

(51) Int. Cl.
*H04L 12/26* (2006.01)
(52) U.S. Cl.
USPC .......................................................... 709/224
(58) Field of Classification Search
USPC .......................................................... 709/224
See application file for complete search history.

(56) References Cited

U.S. PATENT DOCUMENTS

| | | | |
|---|---|---|---|
| 7,454,494 B1 * | 11/2008 | Hedayat et al. ............... | 709/224 |
| 2008/0304421 A1 * | 12/2008 | Ramasubramanian et al. ............... | 370/251 |
| 2009/0122697 A1 * | 5/2009 | Madhyasha et al. .......... | 370/229 |
| 2011/0145715 A1 * | 6/2011 | Malloy et al. ................. | 715/738 |

OTHER PUBLICATIONS

David N. Cottingham, Vehicular wireless communication, Jan. 2009.*
David N. Cottingham, Vehicular wireless communication, 2009.*
Laszlo Lovasz et al. Search Problem in the decision tree Model, 1991.*

* cited by examiner

*Primary Examiner* — Hassan Phillips
*Assistant Examiner* — Omeed D Rahgozar
(74) *Attorney, Agent, or Firm* — Akerman LLP; Michael K. Dixon; Roy P. Zachariah

(57) ABSTRACT

A system for visualization of performance measurements is disclosed. The system may include an electronic data processor configured to receive a stream of the performance measurements and select a maximum number of leaf nodes of a plurality of nodes for use in an adaptive decision tree. Additionally, the electronic processor may be configured to determine a depth of each branch in the adaptive decision tree needed to differentiate performance among internet protocol addresses in an internet protocol prefix of each node. Each of the plurality of nodes may be annotated with a predicted latency category and the processor may be configured to generate the adaptive decision tree based on the maximum number of leaf nodes selected, the depth of each branch determined, the predicted latency category, and on the stream of performance measurements associated with the network. Moreover, the processor may display the adaptive decision tree.

16 Claims, 11 Drawing Sheets

300

400

(a) Day 8: 1am (b) Day 8: 12noon (c) Day 8: 5pm (d) Day 8: 11pm (e) High-Latency Subtree: 1am (f) High-Latency Subtree: 5pm

SYSTEM FOR INTERNET SCALE VISUALIZATION AND DETECTION OF PERFORMANCE EVENTS

FIELD OF THE INVENTION

The present application relates to analyzing and visualizing network performance metrics and, more particularly, to a system for internet scale visualization and detection of performance events.

BACKGROUND

Network servers are relied upon daily by businesses and individuals for facilitating data and content distribution, e-commerce transactions, internet services, and many other types of transactions. Accordingly, ensuring that such network servers are running efficiently with minimal disruptions is a constant goal for network operators. In order to meet that goal, monitoring network performance and effectively diagnosing problems within a network are essential, particularly in providing effective network and server management for various types of clients and users. Currently, several types of systems and methods exist for monitoring networks and diagnosing problems affecting a network. For example, network operators often monitor network performance by utilizing rule-based scripts to flag different types of events of interest based on active and passive measurements. Rule-based scripts or other similar techniques are typically limited to monitoring or analyzing events which have known or defined properties. However, a significant portion of events, systems, or devices which affect networks have unknown or undefined characteristics.

SUMMARY

A system for visualization of performance measurements is disclosed. The system may be configured to generate adaptive decision trees over an internet protocol or other address space by utilizing various types of performance measurements. Addresses with similar performance characteristics may be grouped together by the adaptive decision trees and addresses with significantly different performance characteristics may be separated. As changes in performance occur over time, the system may be configured to update or adjust the decision trees to reflect the performance changes. Additionally, the system may be configured to visually display the adaptive decision trees to a user of the system as they are updated. The system may be configured to select a fixed location for each prefix of each node in the adaptive decision tree based on an internet protocol address and a prefix length of each prefix. Furthermore, the system may be configured to color each node of the adaptive decision trees based on a latency category associated with each prefix of each node.

In one embodiment, the system may include an electronic data processor which may be configured to receive a stream of performance measurements associated with a network and select a maximum number of leaf nodes of a plurality of nodes for use in an adaptive decision tree, wherein each of the nodes of the plurality of nodes corresponds to an internet protocol prefix utilized in the network. The system electronic data processor may also be configured to determine a depth of each branch in the adaptive decision tree needed to differentiate performance among internet protocol addresses in the internet protocol prefix. Additionally, the electronic data processor may be configured to annotate each of the plurality of nodes with a predicted latency category, wherein the predicted latency category is selected from a plurality of latency categories. Moreover, the electronic data processor may be configured to generate the adaptive decision tree based on the maximum number of leaf nodes selected, the depth of each branch determined, the predicted latency category, and on the stream of performance measurements associated with the network. Finally, the electronic data processor may be configured to display the adaptive decision tree, wherein each of the plurality of nodes are distinguished by color based on the predicted latency category.

In another embodiment, a method for visualization of performance measurements may be provided. The method may include receiving a stream of the performance measurements associated with a network and selecting a maximum number of leaf nodes of a plurality of nodes for use in an adaptive decision tree. Each of the nodes of the plurality of nodes may correspond to an internet protocol prefix utilized in the network. The method may also include determining a depth of each branch in the adaptive decision tree needed to differentiate performance among internet protocol addresses in the internet protocol prefix and annotating each of the plurality of nodes with a predicted latency category, wherein the predicted latency category may be selected from a plurality of latency categories. Furthermore, the method may include generating the adaptive decision tree based on the maximum number of leaf nodes selected, the depth of each branch determined, the predicted latency category, and on the stream of performance measurements associated with the network. Moreover, the method may include displaying the adaptive decision tree, wherein each of the plurality of nodes may be distinguished by color based on the predicted latency category.

According to another exemplary embodiment, a computer-readable medium comprising instructions for defending against internet-based attacks may be provided. The computer instructions when loaded and executed by an electronic processor, may cause the electronic processor to perform activities including the following: receiving a stream of performance measurements associated with a network; selecting a maximum number of leaf nodes of a plurality of nodes for use in an adaptive decision tree, wherein each of the nodes of the plurality of nodes corresponds to an internet protocol prefix utilized in the network; determining a depth of each branch in the adaptive decision tree needed to differentiate performance among internet protocol addresses in the internet protocol prefix; predicting a latency category for each of the plurality of nodes; annotating each of the plurality of nodes with the latency category predicted; generating the adaptive decision tree based on the maximum number of leaf nodes selected, the depth of each branch determined, the latency category, and on the stream of performance measurements associated with the network; and displaying the adaptive decision tree, wherein each of the plurality of nodes are distinguished by color based on the latency category.

These and other features of the internet scale visualization system are described in the following detailed description, drawings, and appended claims.

DETAILED DESCRIPTION OF THE INVENTION

The exemplary embodiments of the present disclosure are described with respect to a system for internet scale visualization and detection of performance events. The system may be configured to generate adaptive decision trees over an internet protocol or other address space by utilizing various types of performance measurements, which may be streamed to the system. Addresses of nodes in the decision trees with similar performance characteristics may be grouped together by the adaptive decision trees and addresses with significantly different performance characteristics may be separated. As changes in performance occur over time and as new performance measurements are received by the system, the system may be configured to update or adjust the decision trees to reflect the performance changes. The system may be configured to visually display the adaptive decision trees to a user of the system as they are updated so that the user may see performance changes in real-time. In displaying the adaptive decision trees, the system may be configured to select a fixed location for each prefix of each node in the adaptive decision tree based on an internet protocol address and a prefix length of each prefix. The system may further be configured to color each node of the adaptive decision trees based on a latency category associated with each prefix of each node.

Figure 1:
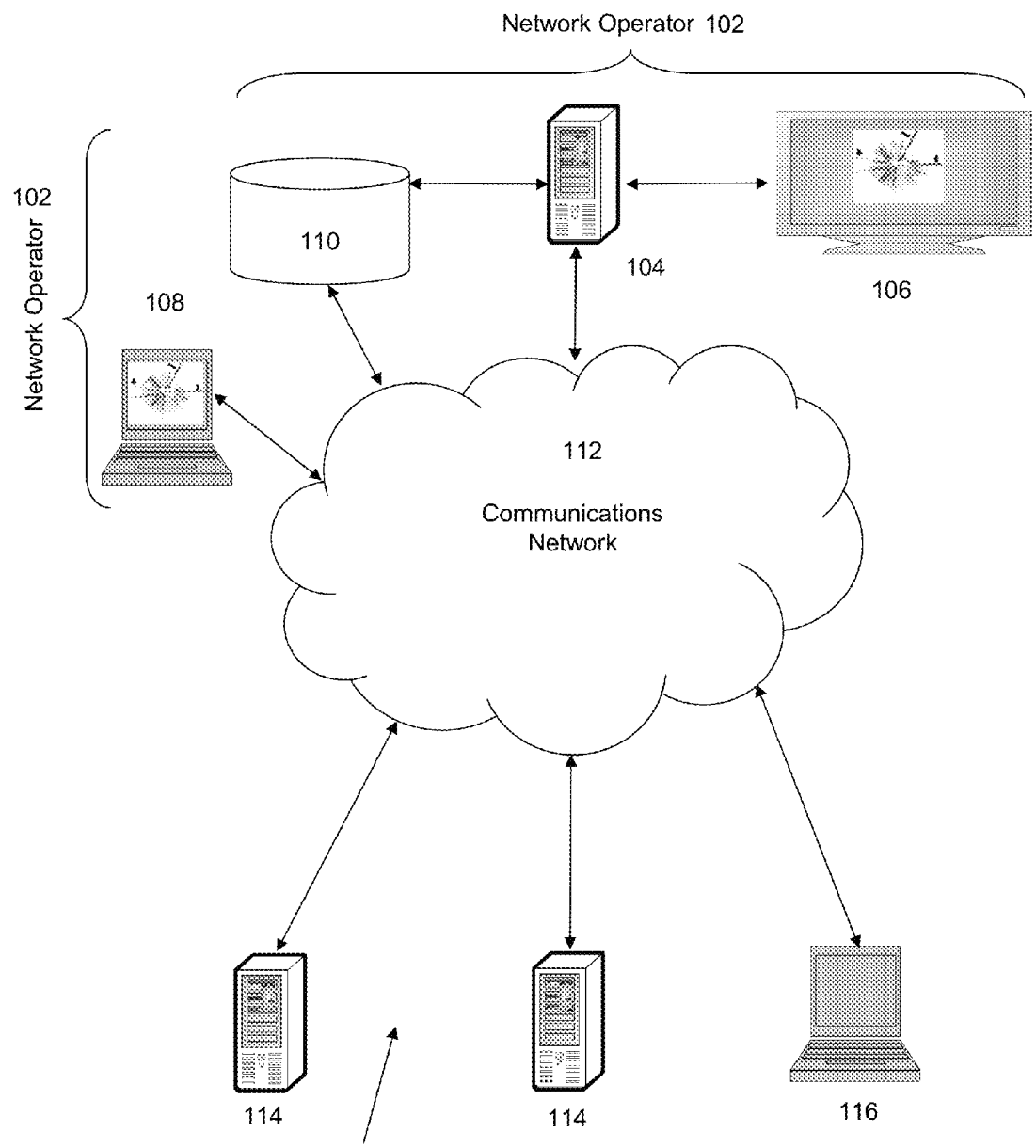
FIG. 1 is a schematic view of a system for internet scale visualization and detection of performance events according to an embodiment of the present invention.

Referring to the drawings and in particular FIG. 1, an exemplary system 100 for internet scale visualization and detection of performance events is schematically illustrated. The system 100 may include a network operator 102, which may be configured to provide network or carrier services such as those provided by internet service providers. Additionally, the network operator 102 may be configured to monitor network performance and diagnose problems associated with various networks that are under the control of the network operator 102. For example, the network operator 102 may be configured to monitor and analyze performance-related issues affecting communications network 112. The network operator 102 may utilize a variety of devices in order to perform various functions and services. Such devices may include computing device 104, display device 106, computing device 108, and database 110. The computing devices 104 and 108 may include devices such as, but not limited to, a server, a router, a computer, an electronic processor, a handheld device, a personal digital assistant, a mobile device, a cellular phone, a smart phone, a communications device, and other devices. Any number of computing devices 104 and 108 may be utilized in the system 100.

The computing devices 104 and 108 may also include an electronic data processor, which may be configured to receive performance measurements from various devices in or associated with the system 100. Additionally, the electronic data processor may be configured to generate decision trees based on the received performance measurements. The electronic data processor may be incorporated into various types of computing devices such as servers, computers, and other similar devices. The display device 106 may be a device such as a monitor, television, or other similar display device and may be configured to display decision trees generated by the computing devices 104 and 108. Database 110 may be configured to store the performance measurements received at the computing devices 104 and 108, communicate with the computing devices 104 and 108, and store the decision trees generated by the processors of computing devices 104 and 108.

Additionally, the system 100 may include a communications network 112, which may include, but is not limited to including, a wireless network, an ethernet network, a satellite network, a broadband network, a cellular network, a private network, a cable network, the Internet, or any other suitable network. The devices provided in system 100 may communicate with one another via the communications network 112. System 100 may further include additional computing devices 114 and 116, which may be servers, computers, laptops, routers, switches, or other similar devices. The performance measurements that the network operator 102 receives may be performance metrics associated with the computing devices 114 and 116 or any other devices that the network operator 102 is configured to monitor.

Operatively, the system 100 may be configured to provide internet scale visualization and detection of performance events by generating adaptive decision trees based on performance measurements associated with various devices that the system 100 monitors. Specifically, the system 100 may be configured to receive performance measurements over a period of time and continually generate and update decision trees over an internet protocol address space as new performance measurements are received. The decision trees may be configured to group internet protocol addresses with similar performance characteristics and separate those addresses with significantly different performance characteristics. As the decision trees are being generated by the computing devices 104 and 108, they may be displayed in real-time via display device 106 or via a monitor of computing device 108.

In generating the decision trees, the network operator 102 and associated devices may be configured to operate under a series of rules. First, in order to provide an effective visualization, performance measurements of the entire Internet or other networks may be analyzed by the computing devices 104 and 108. However, in order to make such a visualization comprehensible and readily usable by technicians of the network operator 102, the decision trees generated by the computing devices 104 and 108 may be configured indicate only the regions need to differentiate performance experience by various clients of the network provider 102. In order to indicate only such regions, the computing devices 104 and 108 may be configured to enforce a limit on the maximum number of leaves each decision tree may include. Second, the computing devices 104 and 108 may be configured to analyze and process multiple levels of internet address spaces because performance problems often occur at multiple different levels in an internet address hierarchy. For example, there may be scenarios where large prefix ranges (e.g., /10 blocks) of an address space may be combined because each of the large prefix ranges experience the same or similar performance-related issues.

On the other hand, other scenarios occur such as when small prefix ranges (e.g., those belong to management systems) need to be identified individually so as to ensure performance is monitored appropriately. In order to account for such scenarios or other similar scenarios, the computing devices 104 and 108 may be configured to infer the depth of each branch in each generated decision tree that is necessary to differentiate performance among various internet protocol address in each given prefix. Third, in order to effectively visualize performance changes across a variety of clients of the network operator 102, the decision trees generated by the computing devices 104 and 108 may be configured to be adaptive decision trees.

Adaptive decision trees may be utilized because the tree structure and accompanying performance indicators may be adjusted by the processors of computing devices 104 and 108 as additional performance measurements are received over a period of time. As an illustration, when visualizing a time series of decision trees, technicians of network operator 102 should be able to quickly visualize internet prefixes that are abnormal, such as when a degrading peering link occurs. Fourth, the computing devices 104 and 108 may be configured to generate the adaptive decision trees over a large volume of performance measurements and update the decision trees periodically. For example, the computing devices 104 and 108 may update the decision trees every five minutes or at other designated time intervals chosen by the network operator 102.

In order to generate adaptive decision trees, the computing devices 104 and 108 may execute a tree constructor program utilizing their processors to generate trees conforming to the aforementioned rules. The tree constructor program may be configured to receive the performance measurements associated with devices such as computing devices 114 and 116. Performance measurements may include, but are not limited to including, round-trip-time measurements, latency measurements, throughput measurements, packet loss measurements, bandwidth measurements, or other similar measurements for analyzing performance. Once the adaptive decision trees are generated, a visualizer program may be utilized by the computing devices 104 and 108 to generate visualizations of the generated trees so that technicians may be able to effectively view performance changes over time. At each designated time interval, the tree constructor program may be configured to transmit updated decision trees to the visualizer program. As the visualizer program receives each updated tree, the computing devices 104 and 108 may be configured to display a graphic for each tree. Each node in the graphic of the decision tree may be colored according to their accompanying performance values.

Figure 2:
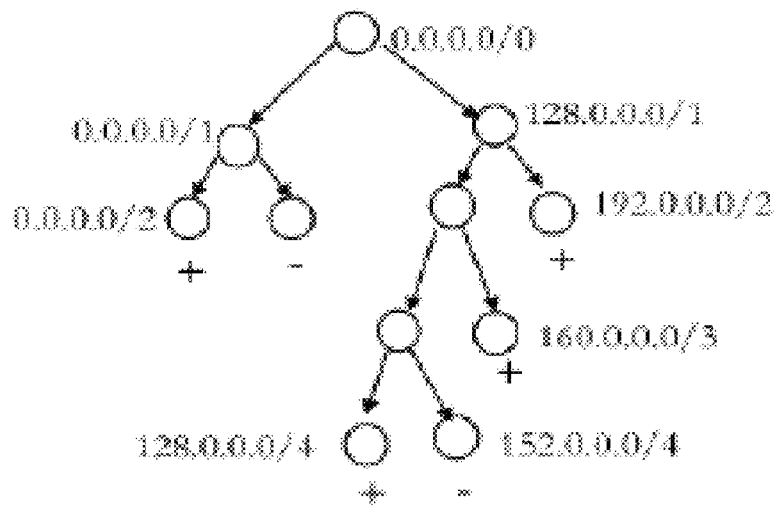
FIG. 2 is a visual illustration of an internet tree having a tree size of six.

In an embodiment, the computing devices 104 and 108 may construct decision trees according to the following definitions and algorithms: A decision tree may be an IPTree$T_p$ over an internet protocol address hierarchy that includes nodes having internet prefixes P∈P and leaves that are each associated with a prediction label. For example, the prediction label may be "0-20 ms." Therefore, in this instance, an IPTree may be a decision tree for internet protocol addresses I: an internet protocol address I gets a label associated with its longest matching prefix in P. The size of an IPTree may be the number of leaves necessary when represented as a binary tree. FIG. 2 provides an illustration of an IPTree having a tree size of six, while being represented as a binary tree. An adaptive k-IPTree may be defined as an IPTree that may contain at most k leaves, grow nodes over a period of time, change the labels of its leaf nodes, and reconfigure its structure itself. The size k of a tree may be chosen based on past predictive accuracy measured for data such that the accuracy does not increase significantly with increased k or drop substantially over time. The IPTree may be learnt over a stream of changing performance data, the learning problem may fit in the mistake-bound model of online learning. In the mistake-bound model of online learning, the algorithm may be configured to receive an internet protocol address to be classified and then make a latency prediction for the internet protocol address to be classified. Once the algorithm has made its prediction, the algorithm may be configured to receive an accurate latency associated with the classified internet protocol address and update its internal state.

In an embodiment, latency measurements may be split into m categories and the IPTree may be required to predict the correct latency category for a particular address. For example, sample categories may be latencies ranging from 20 ms-40 ms, 40 ms-60 ms, 60 ms-80 ms, 80 ms-100 ms, 100 ms-200 ms, and greater than or equal to 200 ms. Therefore, the algorithm may be adapted to compute efficiently a k-adaptive IPTree that has high predictive accuracy. The original algorithm involves having all parent prefixes of an internet protocol address i in the current IPTree in making a latency prediction for I, and in updating itself. The algorithm may be modified to have each parent prefix to predict from m categories rather than from predicting only from two categories. This may be accomplished by replacing the shifting experts' algorithm by the weighted majority algorithm with shifting targets. Additionally, the original algorithm splits a leaf node in the tree once the path leading to the leaf node has made enough errors. This may be modified by penalizing the algorithm more when it predicts a category that is further away from the actual latency than one that is close to the true latency.

In an embodiment, the algorithm may be configured to count the number of latency categories between the predicted category and the actual latency. However, other means for increasing the penalty in accordance with errors may be utilized as well. By using the above modifications, the computing devices 104 and 108 may compute an adaptive k-IPTree over an input stream of internet protocol addresses and their associated latencies. In another embodiment, the algorithm may include annotating each prefix of the IPTree with the number of performance measurements received and the latency category predicted for all internet protocol addresses in the subprefixes of the prefix. After annotating the tree, the computing devices 104 and 108 may be configured to transmit the annotated IPTree to the visualizer program, which may, via the computing devices 104 and 108, be configured to display a time series of IPTrees. By displaying a time series of IPTrees, a technician of the network operator 102 can readily view changes in predictions and tree structure. In an embodiment, the computing devices 104 and 108 may be configured to split prefixes that contain many internet protocol address with moderate latency differences and split prefixes that contain fewer internet protocol addresses with large latency differences.

With regard to visualizing the adaptive decision trees, the computing devices 104 and 108 may be configured to render decision trees over a time series. In order to do so, the computing devices 104 and 108 may execute the visualizer program and via the visualizer program select a unique fixed location for each internet protocol prefix based on its internet protocol address and its prefix length. In an embodiment, the angular location may be chosen with the internet protocol address interpreted as an integer I, i.e., $(360i)/(2^{32})$, and the radial distance may be based on the prefix length. In doing so, larger prefixes (e.g., /8) may be positioned closer to the center and smaller prefixes may be positioned further away from the center. The particular latency predictions for a particular prefix and its respective importance may be reflected by the display of its corresponding node. Each prefix (node) may be displayed by the visualizer as one of a series of colors. For example, based on the prefix's annotated latency category, the prefix may be displayed as green, yellow, or red in color. Red may be utilized to indicate significant performance issues for a particular prefix, yellow may be utilized to indicate a cautionary or intermediate level of performance related issues, and green may be utilized to indicate that the performance for that particular prefix is normal.

In an embodiment, the size of an internet protocol prefix may be configured to factor in the number of performance measurements received for the prefix during a particular time interval. For example, the prefix size may be scaled by a log factor of the number of performance measurements. The prefix itself may be annotated with its corresponding internet protocol address, so that a technician may be able to detect performance-related issues for the prefix and any subprefixes. In an embodiment, the visualizer may be configured to display only specific subtrees of the IPTree. By displaying only subtrees, the technician can more readily view targeted areas that have performance problems. As an illustration, if there is a particular subtree that includes only prefixes with latencies over 200 milliseconds, a time series of these subtrees would illustrate regions having poor latency on both regular and rare instances. Thus, the visualizer program may be configured to have a filter feature, which can enable a technician to quickly focus on a particular region of interest with relative ease.

Figure 3:
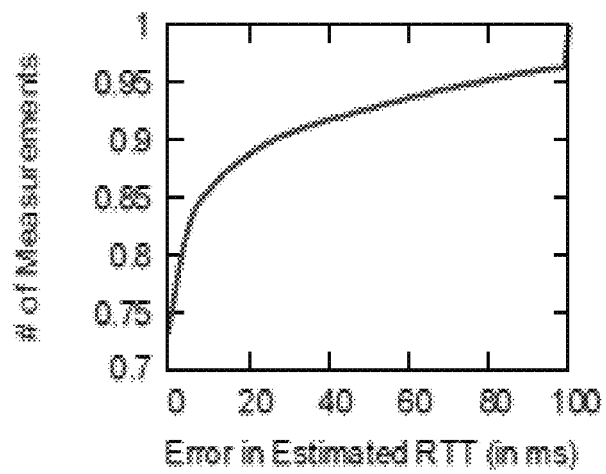
FIG. 3 is a line graph illustrating the error in estimating latency over a data set.
Figure 4:
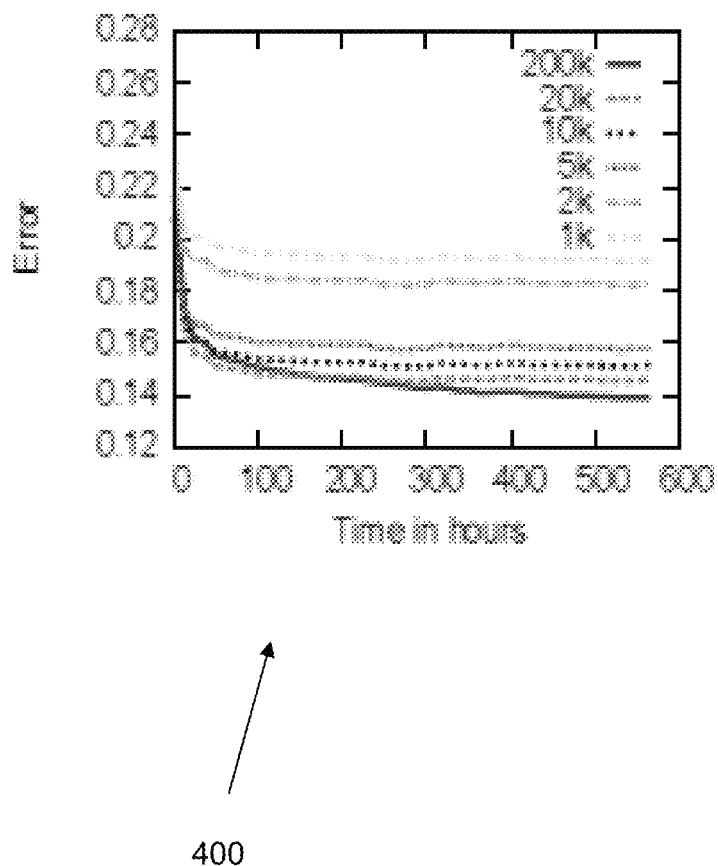
FIG. 4 is a line graph illustrating the fraction of misclassified categories over time for k ranging from 1000 to 200,000.

In demonstrating the algorithm's accuracy in predicting latency categories, FIG. 3 illustrates the error in estimating a latency category (in this case round trip time measurements), which may be computed as the difference between the actual round trip time and the predicted latency category for k=20,000, over an entire data set. As noted from FIG. 3, it can be seen that 83% of round trip times are estimated within 5 ms of their latency category, and 90% are estimated within 20 ms of their latency category. By this example, the IPTree's latency category prediction is shown to be accurate enough for visualizing performance in most instances. When selecting the tree size k for a particular tree visualization, the algorithm's accuracy may be visualized over a period of time for different values of k. As an example, FIG. 4 illustrates the fraction of misclassified categories over a period of time for k ranging from 1,000 to 200,000. As can be seen, utilizing k=1,000 or k=2,000 produces greater errors than utilizing k=5,000. However, as further illustrated in FIG. 4, increasing k beyond 5000 reduces the error by only 1% compared to k=200,000. Thus, in this example, utilizing k=5,000 provides results without sacrificing a significant amount of accuracy.

Figure 5A:
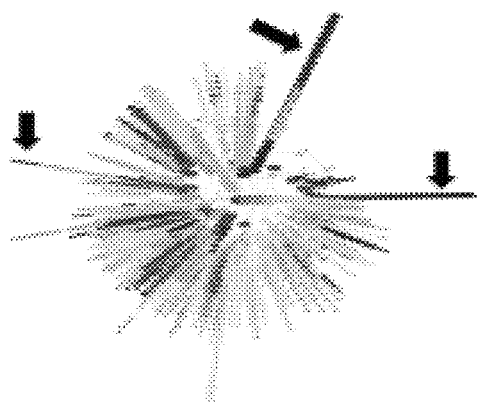
FIGS. 5A-5D are visualizations of an adaptive decision tree taken at different times during a day.
Figure 5B:
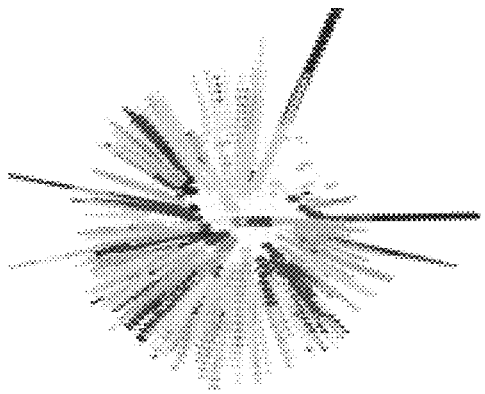
Figure 5C:
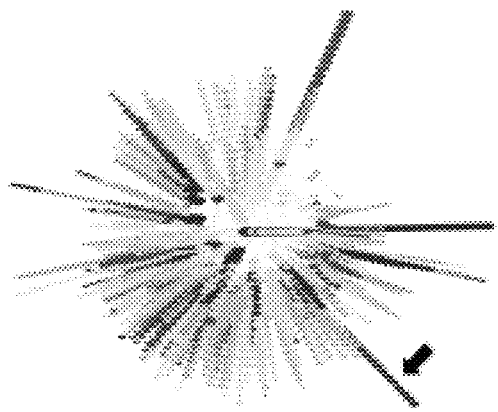
Figure 5D:
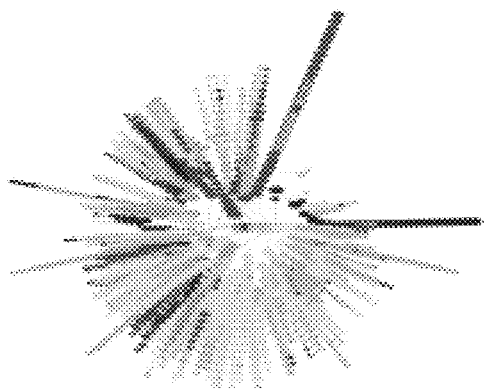
Figure 5E:
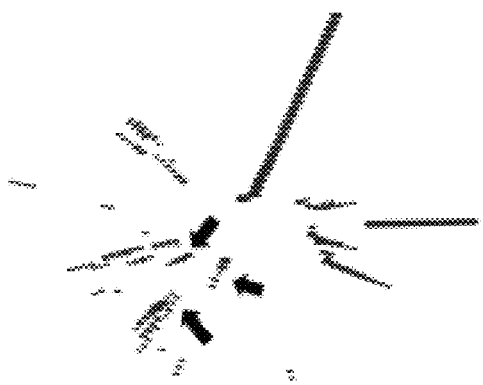
FIGS. 5E-5F are visualizations of high-latency subtrees taken at different times during a day.
Figure 5F:
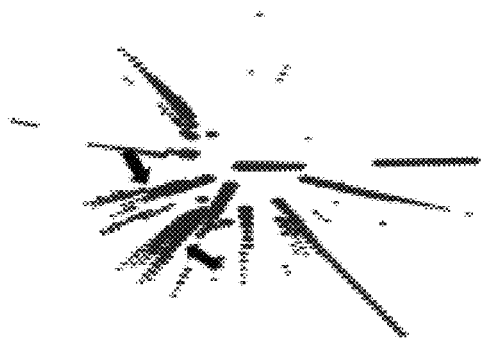

FIG. 5A-5F provide illustrations of the tree graphics produced by the visualizer program and round trip time issues detected utilizing the tree constructor program. Specifically, FIGS. 5A-5D illustrate trees generated for various hours of the day and FIGS. 5E-5F illustrate high-latency subtrees. As highlighted in FIG. 5A, three long spikes illustrating poor performance are each displayed in red to illustrate the poor performance of those particular prefixes. In a case study, it was determined that the three long spikes correlated to management nodes of a distributed server farm, so there was no direct concern with respect to the server farm's operation. The internet protocol addresses had round trip times, which 73%-81% of the time exceed 90 ms and if a particular management node failed, the spike would disappear from the visualization. FIG. 5E illustrates permanent red areas that are larger prefixes which range from /12 to /18 blocks. The larger prefixes that are displayed as being closer to the tree's center belonged to a wireless carrier and that 56-72% of the corresponding round trip times in these prefixes were over 80 ms. Although such high round trip times may be expected for wireless carriers, users may still have experienced performance issues, particularly with respect to accessing content that was sensitive to latency.

In another example, as highlighted by FIG. 5F, a part of the IPTree that consistently appears, but experiences poor latency only occasionally is shown. As can be visualized from FIG. 5A, this particular region starts out as being displayed as green in color and then gradually shifting to yellow and red during the later hours. FIG. 5F clearly visualizes the subtrees which end up having significant performance related issues. Upon inspection, it was revealed that many of these prefixes were associated with access internet service providers that appeared to show congestion during the later hours, even though other internet service providers did not show similar congestion. Upon further validating the performance data, it was shown that for these access internet service providers, approximately 40% of the round trip times increase by over 40 ms, which was significant. Without having such a graphic to view such performance issues, having a technician using traditional tools to find all the internet service providers would be time consuming and tedious.

In yet another example, the tree constructor program and visualizer programs executed by either or both computing devices 104 and 108 may provide assistance in detecting anomalous events that may ordinarily be lost in noise. FIG. 5C illustrates a highlighted prefix that is not illustrated in either of FIG. 5A, 5B, or 5D. Upon inspecting, it was determined that the prefixes for highlighted spike belonged to an internet service provider and the internet protocol addresses accounted for less than 0.02%-0.05% of the round trip times during those hours, however, 95% of the round trip times exceeded 80 ms and about 41% exceeded 200 ms. Although, this particular spike was only a fraction of the total volume of data, the tree constructor was able to distinguish it from parent prefixes with significantly greater data and with 95% of round trip times under 80 ms. Additionally, the geographical location of this particular set of internet protocol addresses suggested that these clients were misdirected at the time.

Figure 6:
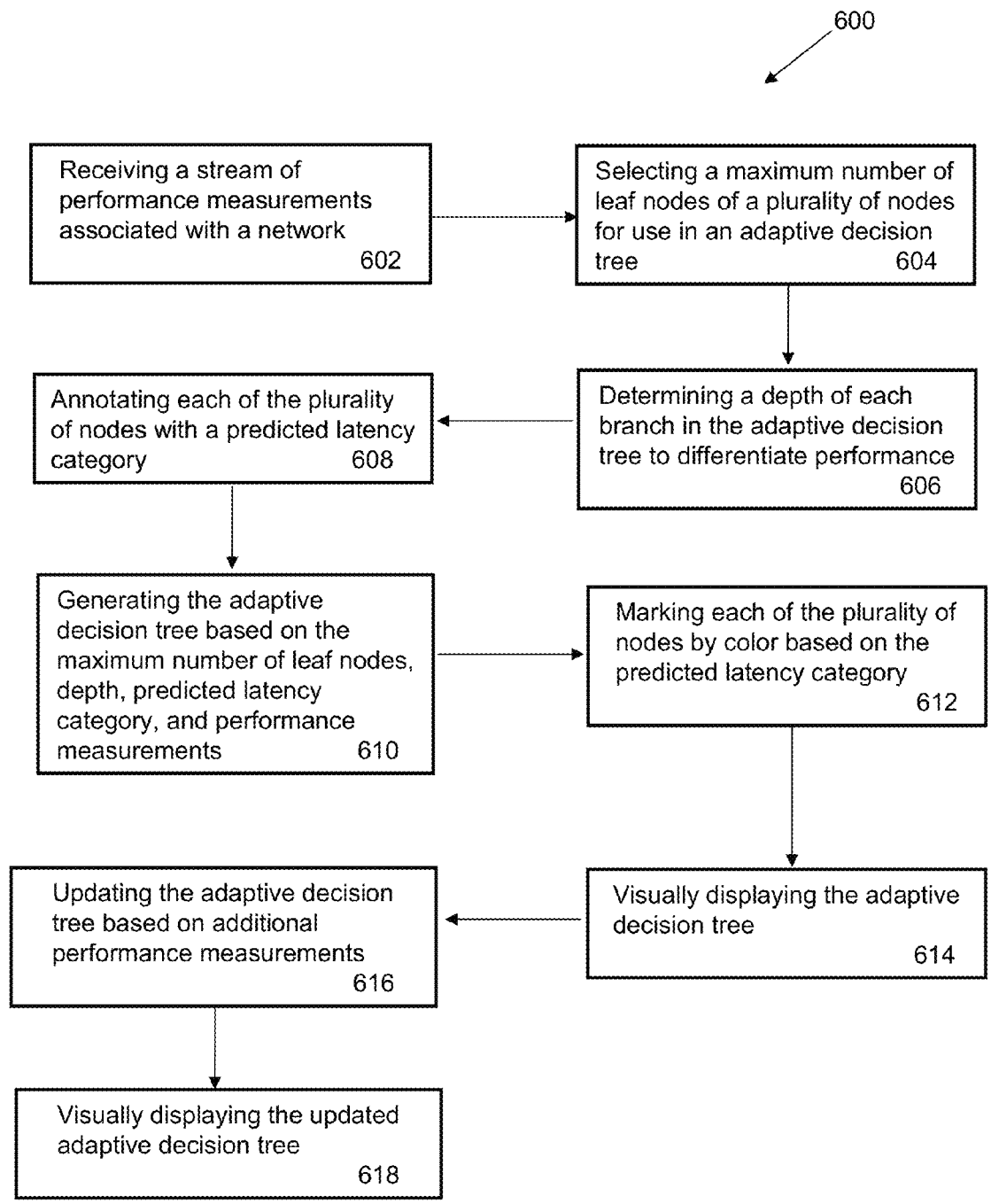
FIG. 6 depicts a method for internet scale visualization and detection of performance events according to the system.

Referring now also to FIG. 6, an exemplary method 600 for internet scale visualization and detection of performance events is depicted. The method 600 may include, at step 602, receiving a stream of performance measurements associated with a network. At step 604, the method 600 may include selecting a maximum number of leaf nodes of a plurality of nodes for use in an adaptive decision tree. Notably, each of the nodes of the plurality of nodes may correspond to an internet protocol prefix that may be used in the network. The method 600 may also include, at step 606, determining a depth of each branch in the adaptive decision tree needed to differentiate performance among internet protocol addresses in the internet protocol prefix. At step 608, the method 600 may include annotating each of the plurality of nodes with a predicted latency category. The predicted latency category may be selected from a plurality of latency categories, which may be up to m categories. At step 610, the method 600 may include generating the adaptive decision tree based on the maximum number of leaf nodes selected, the depth of each branch determined, the predicted latency category, and on the stream of performance measurements associated with the network. Also, the method 600 may include, at step 612, marking each of the plurality of nodes by color based on the predicted latency category.

At step 614, the method 600 may include visually displaying the adaptive decision tree. At step 616, the method may include updating the adaptive decision tree based on additional performance measurements received. The method 600 may further include, at step 618, visually displaying the updated adaptive decision tree. In an embodiment, the method 600 may also include annotating each node with the corresponding number of the performance measurements received for that particular node. In another embodiment, the method 600 may include determining the number of latency categories between the predicted latency category and the actual latency for the node. Once the number of latency categories is determined, the method 600 may include splitting the internet protocol prefix if the number indicates a moderate latency difference when the internet protocol prefix contains many internet protocol addresses, and splitting the internet protocol prefix if the number indicates a large latency difference when the internet protocol prefix contains relatively few internet protocol addresses.

Also, the method 600 may include selecting a fixed location for the internet protocol prefix in the adaptive decision tree based on a corresponding internet protocol address and a prefix length of the internet protocol prefix. An angular location of the fixed location, which may be based on interpreting the corresponding internet protocol address as an integer, and a radial distance of the fixed location, which may be based on the prefix length of the internet protocol prefix may also be selected. In an embodiment, the method 600 may include displaying a time series of the adaptive decision tree over a designated time period. In an embodiment, the performance measurements may include, but are not limited to including, round trip time measurements, latency measurements, throughput measurements, packet loss measurements, or bandwidth measurements.

In another embodiment, the method 600 may include generating a rule-based script for a performance event based on the adaptive decision tree. The rule-based script may be configured to automatically flag each instance of the performance event as additional performance measurements are received. In yet another embodiment, the method 600 may include filtering a selected subtree of the adaptive decision tree and visually displaying only the selected subtree of the adaptive decision tree. Furthermore, it is important to note that the methods described above may incorporate any of the functionality, devices, and/or features of the systems described above and are not intended to be limited to the description provided above.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard), a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

We claim:

1. A method for visualization of performance measurements, the method comprising:
receiving a stream of the performance measurements associated with a network, wherein the performance measurements comprise round trip time measurements, latency measurements, throughput measurements, packet loss measurements, or bandwidth measurements;
selecting a maximum number of leaf nodes of a plurality of nodes for use in an adaptive decision tree, wherein each of the nodes of the plurality of nodes corresponds to an internet protocol prefix utilized in the network;
determining a depth of each branch in the adaptive decision tree needed to differentiate performance among internet protocol addresses in the internet protocol prefix;
annotating each of the plurality of nodes with a predicted latency category, wherein the predicted latency category is selected from a plurality of latency categories;
determining a number of latency categories of the plurality of latency categories between the predicted latency category and an actual latency;
splitting the internet protocol prefix based on a latency difference indicated by the number of latency categories between the predicted latency category and the actual latency, and splitting the internet protocol prefix based on a quantity of the internet protocol addresses in the internet protocol prefix;
generating, by utilizing instructions from memory that are executed by a processor, the adaptive decision tree based on the number of latency categories, the maximum number of leaf nodes selected, the depth of each branch determined, the predicted latency category, and on the stream of performance measurements associated with the network; and
displaying the adaptive decision tree to a user, wherein each of the plurality of nodes are distinguished by color based on the predicted latency category.

2. The method of claim 1, further comprising generating an updated adaptive decision tree based at least in part on additional performance measurements received over a time interval and further comprising visually displaying the updated adaptive decision tree.

3. The method of claim 1, further comprising annotating a node of the plurality of nodes with a corresponding number of the performance measurements received for the node.

4. The method of claim 1, further comprising selecting a fixed location for the internet protocol prefix in the adaptive decision tree based on a corresponding internet protocol address and a prefix length of the internet protocol prefix.

5. The method of claim 4, further comprising selecting an angular location of the fixed location based on interpreting the corresponding internet protocol address as an integer, and selecting a radial distance of the fixed location based on the prefix length of the internet protocol prefix, wherein the angular location and the radial distance are utilized in displaying the adaptive decision tree.

6. The method of claim 1, further comprising displaying a time series of the adaptive decision tree over a designated time period.

7. The method of claim 1, further comprising generating a rule-based script for a performance event based on the adaptive decision tree, wherein the rule-based script is configured to automatically flag each instance of the performance event as additional performance measurements are received.

8. The method of claim 1, further comprising filtering a selected subtree of the adaptive decision tree and further comprising visually displaying only the selected subtree of the adaptive decision tree to the user.

9. A system for visualization of performance measurements, the system comprising:
a memory that stores instructions;
a processor that executes the instructions to perform operations comprising:
receiving a stream of the performance measurements associated with a network, wherein the performance measurements comprise round trip time measurements, latency measurements, throughput measurements, packet loss measurements, or bandwidth measurements;
selecting a maximum number of leaf nodes of a plurality of nodes for use in an adaptive decision tree, wherein each of the nodes of the plurality of nodes corresponds to an internet protocol prefix utilized in the network;
determining a depth of each branch in the adaptive decision tree needed to differentiate performance among internet protocol addresses in the internet protocol prefix;
annotating each of the plurality of nodes with a predicted latency category, wherein the predicted latency category is selected from a plurality of latency categories;

determining a number of latency categories of the plurality of latency categories between the predicted latency category and an actual latency;

splitting the internet protocol prefix based on a latency difference indicated by the number of latency categories between the predicted latency category and the actual latency, and splitting the internet protocol prefix based on a quantity of the internet protocol addresses in the internet protocol prefix;

generating the adaptive decision tree based on the number of latency categories, the maximum number of leaf nodes selected, the depth of each branch determined, the predicted latency category, and on the stream of performance measurements associated with the network; and displaying the adaptive decision tree to a user, wherein each of the plurality of nodes are distinguished by color based on the predicted latency category.

10. The system of claim 9, wherein the operations further comprise selecting a fixed location for the internet protocol prefix in the adaptive decision tree based on a corresponding internet protocol address and a prefix length of the internet protocol prefix.

11. The system of claim 9, wherein the operations further comprise filtering a subtree of the adaptive decision tree and only displaying the subtree of the adaptive decision tree that is filtered to the user.

12. The system of claim 9, wherein the operations further comprise displaying a time series of the adaptive decision tree over a designated time period.

13. The system of claim 9, wherein the operations further comprise generating a rule-based script for a performance event based on the adaptive decision tree, wherein the operations further comprise flagging each instance of the performance event.

14. A computer-readable device comprising instructions, which, when loaded and executed by a processor, cause the processor to perform operations comprising:

receiving a stream of performance measurements associated with a network, wherein the performance measurements comprise round trip time measurements, latency measurements, throughput measurements, packet loss measurements, or bandwidth measurements;

selecting a maximum number of leaf nodes of a plurality of nodes for use in an adaptive decision tree, wherein each of the nodes of the plurality of nodes corresponds to an internet protocol prefix utilized in the network;

determining a depth of each branch in the adaptive decision tree needed to differentiate performance among internet protocol addresses in the internet protocol prefix;

predicting a latency category for each of the plurality of nodes;

annotating each of the plurality of nodes with the predicted latency category;

determining a number of latency categories of a plurality of latency categories between the predicted latency category and an actual latency;

splitting the internet protocol prefix based on a latency difference indicated by the number of latency categories between the predicted latency category and the actual latency, and splitting the internet protocol prefix based on a quantity of the internet protocol addresses in the internet protocol prefix;

generating the adaptive decision tree based on the number of latency categories, the maximum number of leaf nodes selected, the depth of each branch determined, the latency category, and on the stream of performance measurements associated with the network; and displaying the adaptive decision tree to a user, wherein each of the plurality of nodes are distinguished by color based on the latency category.

15. The computer-readable device of claim 14, wherein the operations further comprise filtering a subtree of the adaptive decision tree and visually displaying only the subtree of the adaptive decision tree that is filtered to the user.

16. The computer-readable device of claim 14, wherein the operations further comprise displaying a time series of the adaptive decision tree over a designated time period.

* * * * *